US010810380B2

(12) United States Patent
Pino et al.

(10) Patent No.: US 10,810,380 B2
(45) Date of Patent: Oct. 20, 2020

(54) TRANSLITERATION USING MACHINE TRANSLATION PIPELINE

(71) Applicant: Facebook, Inc., Menlo Park, CA (US)

(72) Inventors: Juan Miguel Pino, Cambridge (GB); Madhu Ramanathan, Mountain View, CA (US)

(73) Assignee: FACEBOOK, INC., Menlo Park, CA (US)

(*) Notice: Subject to any disclaimer, the term of this patent is extended or adjusted under 35 U.S.C. 154(b) by 366 days.

(21) Appl. No.: 15/387,514

(22) Filed: Dec. 21, 2016

(65) Prior Publication Data
US 2018/0174572 A1    Jun. 21, 2018

(51) Int. Cl.
*G06F 17/22* (2006.01)
*G06F 40/58* (2020.01)
*G06F 40/44* (2020.01)
*G06F 40/129* (2020.01)

(52) U.S. Cl.
CPC .......... *G06F 40/58* (2020.01); *G06F 40/129* (2020.01); *G06F 40/44* (2020.01)

(58) Field of Classification Search
CPC .. G06F 17/2217; G06F 17/2252; G06F 17/28; G06F 17/2809; G06F 17/2863
See application file for complete search history.

(56) References Cited

U.S. PATENT DOCUMENTS

| 5,729,694 | A | * | 3/1998 | Holzrichter | .......... G06Q 20/204 704/270 |
| 6,021,403 | A | * | 2/2000 | Horvitz | .................... G06N 5/00 706/45 |
| 6,233,545 | B1 | * | 5/2001 | Datig | ..................... G06N 3/004 704/2 |
| 6,618,697 | B1 | | 9/2003 | Kantrowitz et al. | |
| 7,398,199 | B2 | * | 7/2008 | Gong | .................. G06F 17/2223 704/8 |
| 7,640,158 | B2 | | 12/2009 | Detlef et al. | |
| 8,156,414 | B2 | | 4/2012 | Zandifar et al. | |
| 8,655,642 | B2 | * | 2/2014 | Fux | ........................ G06F 3/0237 704/2 |
| 9,286,526 | B1 | | 3/2016 | Manohar | |
| 9,785,630 | B2 | * | 10/2017 | Willmore | ............... G06F 17/276 |
| 2002/0156816 | A1 | | 10/2002 | Kantrowitz et al. | |

(Continued)

OTHER PUBLICATIONS

Non-Final Office Action dated Sep. 8, 2017 in U.S. Appl. No. 14/788,578, by Eck, M., et al., filed Jun. 30, 2015.

(Continued)

*Primary Examiner* — Michael N Opsasnick

(57) ABSTRACT

Embodiments are disclosed for transliteration based on a machine translation model training pipeline. A method according to some embodiments includes steps of: training a probabilistic model for transliteration from a first script system to a second script system using a machine translation model training pipeline; segmenting, using the probabilistic model, an input string in the first script system into phonemes that correspond to characters in the second script system; converting the phonemes in the first script system into the characters in the second script system, the characters forming a word or a word prefix in the second script system; and outputting the word or the word prefix in the second script system.

18 Claims, 8 Drawing Sheets

(56) References Cited

U.S. PATENT DOCUMENTS

| | | | |
|---|---|---|---|
| 2004/0186717 A1* | 9/2004 | Savic | G10L 21/02 704/256 |
| 2004/0215449 A1* | 10/2004 | Roy | G10L 15/08 704/211 |
| 2006/0031239 A1* | 2/2006 | Koenig | G06F 16/20 |
| 2006/0149558 A1* | 7/2006 | Kahn | G10L 15/063 704/278 |
| 2008/0215309 A1* | 9/2008 | Weischedel | G06F 17/2229 704/3 |
| 2009/0182728 A1 | 7/2009 | Anderson et al. | |
| 2009/0226098 A1 | 9/2009 | Takahashi et al. | |
| 2011/0193797 A1 | 8/2011 | Unruh | |
| 2012/0010988 A1* | 1/2012 | Ramer | G06Q 30/0247 705/14.46 |
| 2012/0089996 A1* | 4/2012 | Ramer | H04H 60/46 725/14 |
| 2012/0096019 A1* | 4/2012 | Manickam | H04L 29/12632 707/767 |
| 2013/0096911 A1 | 4/2013 | Beaufort et al. | |
| 2014/0095143 A1 | 4/2014 | Jan et al. | |
| 2014/0365221 A1* | 12/2014 | Ben-Ezra | G10L 15/142 704/256.1 |
| 2015/0051896 A1 | 2/2015 | Simard et al. | |
| 2015/0058019 A1* | 2/2015 | Chen | G10L 13/02 704/260 |
| 2017/0004120 A1 | 1/2017 | Pino et al. | |
| 2017/0004121 A1 | 1/2017 | Pino et al. | |
| 2017/0017636 A1 | 1/2017 | Hasan et al. | |

OTHER PUBLICATIONS

Koehn, P. et al., "Statistical Phrase-Based Translation," Proceedings of the 2003 Conference of the North American Chaper of the Association for Computational Linguistics on Human Language Technology—vol. 1, Assoc, for Computational Linguistics, 2003, pp. 48-54.

Vogel, S. et al., "HMM-Based Word Alignment in Statistical Translation." In Proceedings of the 16th Conference on Computational Linguistics—vol. 2, Association for Computational Linguistics, 1996, pp. 836-841.

U.S. Appl. No. 14/788,578 by Eck, M., et al., filed Jun. 30, 2015.

U.S. Appl. No. 14/788,679 by Pino, J., et al., filed Jun. 30, 20156.

U.S. Appl. No. 15/387,535 by Pino, J., et al., filed Dec. 21, 2016.

U.S. Appl. No. 15/387,551 by Pino, J., et al., filed Dec. 21, 2016.

Non-Final Office Action dated May 24, 2017 in U.S. Appl. No. 14/788,679, by Pino, J., et al., filed Jun. 30, 2015.

Notice of Allowance dated Oct. 11, 2017 in U.S. Appl. No. 14/788,679, by Pino, J., et al., filed Jun. 30, 2015.

* cited by examiner

TRANSLITERATION USING MACHINE TRANSLATION PIPELINE

BACKGROUND

Transliteration is a process of converting a text written in a first script, e.g., a human-readable script, into a corresponding text written in a second script. The second script uses characters that are different from characters of the first script. In other words, transliteration is a mapping from one system of writing script into another system of writing script, typically grapheme to grapheme (or phoneme to phoneme). As a result of the transliteration, the converted text written in the second script is legible for users who know how to read the second script. A goal of transliteration is that the text in the second script should accurately and unambiguously represents the characters of the original text in the first script. However, an inherent difficulty of the conventional transliteration techniques is that the transcribed graphemes or phonemes can be ambiguous. For Example, a single phoneme in an input script may correspond to one or many characters in a target script, and any given character in the target script may be transliterated with various phonemes.

DETAILED DESCRIPTION

Figure 1:
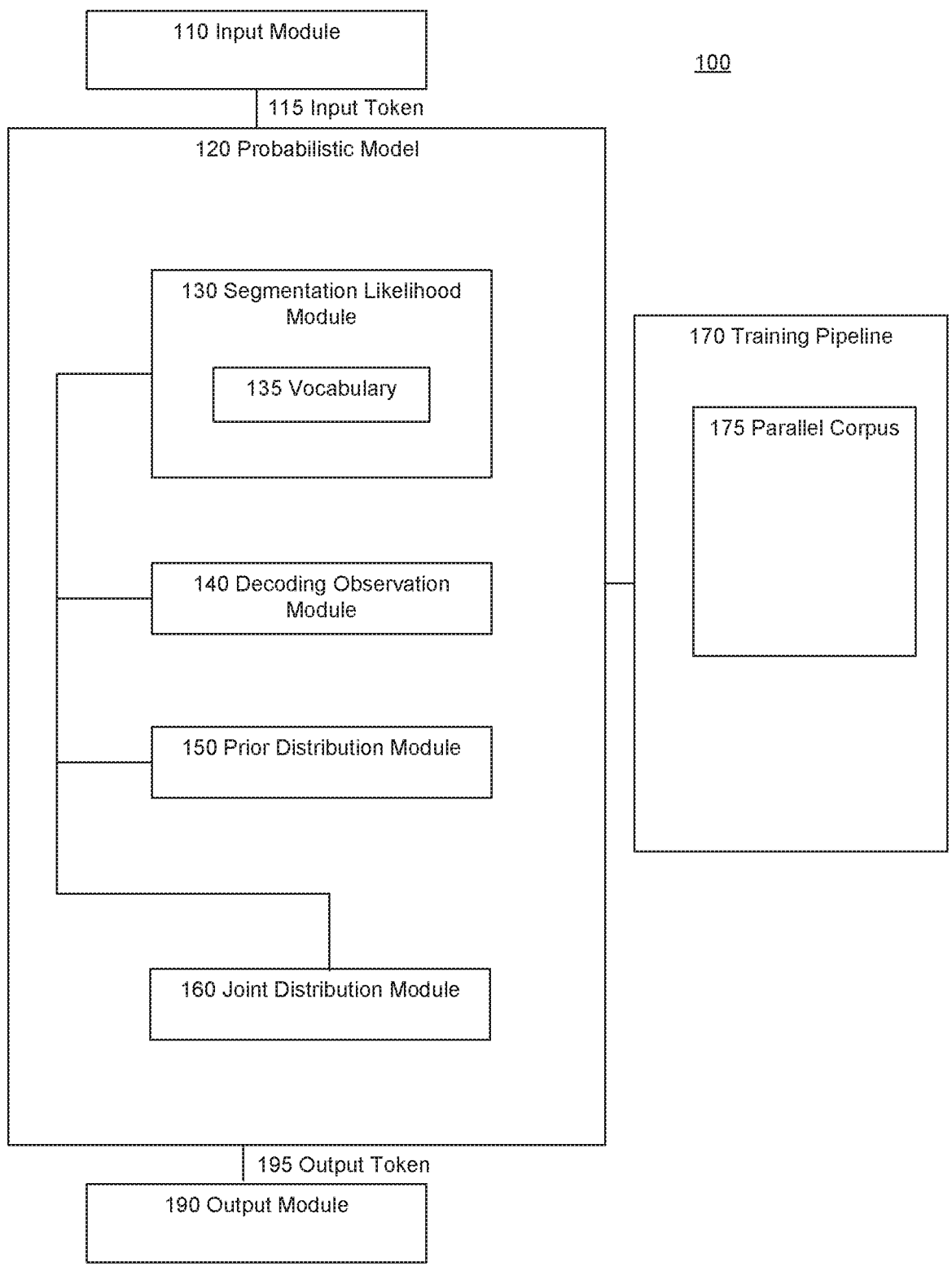
FIG. 1 is a block diagram illustrating a machine transliteration system for converting texts from one transcript to another transcript.

The disclosed embodiments implement an automated machine transliteration system for transliterating texts between different scripts. The machine transliteration system includes a probabilistic model that resolves ambiguities that can be inherent in conventional transliteration techniques. In some embodiments, the probabilistic model operates on a word (also referred to herein as "token") level. The model segments each input token into one or more phonemes and decodes the phonemes based on a prefix tree model or a graph model of the input token. A prefix tree model includes a tree data structure having branches with multiple nodes corresponding to different candidates of phonemes. A graph model includes a graph data structure having nodes interconnected with edges that correspond to phonemes at different locations. The prefix tree model and the graph model are discussed in further detail below in the "Representation of Segmentation" section.

Based on an insight that phonemes form a linear segmentation of a source text, the probabilistic model determines alignment of characters in the transliterated text by leveraging the principles of monotonicity and completeness of the alignment. Monotonicity refers to an observation that relative positions "alignment" of the characters do not change during a transliteration process. Completeness refers to an observation that there is a one-to-one mapping between phoneme positions in the input token in the source script and target character positions in the output token in the target script. The parameters of this probabilistic model can be learned (e.g., the machine transliteration system can be trained) based on a training set. The Training set can be received from human input, publicly available pre-transliterated data, etc.

The machine transliteration system can be used, e.g., to enter text in different scripts using a keyboard (either a hardware keyboard or a software keyboard) that is designed for a particular script, e.g., a Latin script. For example, one common Latin script keyboard layout across various devices is a QWERTY layout. The QWERTY layout is well-suited for entering texts in Latin script (also referred to herein as "Roman script"), e.g., texts written in English, French, Dutch, Spanish, Portuguese and Swedish languages. However, there are many other non-Latin scripts, e.g., Chinese, Greek, Brahmic, Cyrillic and Arabic scripts that are used in texts written in other languages, e.g., Chinese, Japanese, Greek, Hindi, Russian, Bulgarian, Arabic and Iranian. Input of the texts written in non-Latin scripts using a Latin script keyboard requires different input methods. Using the machine transliteration system, the texts written in non-Latin scripts can be entered using a QWERTY layout keyboard (or other types of Latin script keyboards) in transliterated forms. The non-Latin characters in non-Latin script can be encoded, e.g., using a Unicode standard. As used herein, the term "written" can mean entered into a computing device, e.g., using a keyboard or other input device, or more generally commonly employed by human writers or readers.

Conventional transliteration techniques transcribe the target script phonetically. For example, a Hiragana character in Japanese or a Devanagari character in Hindi may be transcribed as specific corresponding phonemes. However, an inherent difficulty of the conventional transliteration techniques is that the transcribed graphemes or phonemes can be ambiguous. For Example, a single phoneme in an input script may correspond to one of many characters in a target script, and any given character in the target script may be transliterated with various phonemes. The disclosed machine transliteration system solves this problem by delivering accurate transliteration predictions based on probabilities of certain combinations of target characters, e.g., that together form a valid word in the target language.

Probabilistic Model for Machine Transliteration

FIG. 1 is a block diagram illustrating a machine transliteration system 100 for converting texts from a first script to a second, different script, consistent with various embodiments. The machine transliteration system 100 includes an input module 110, a probabilistic model 120, a training pipeline 170, and an output module 190.

The input module 110 receives an input token 115 written in a source script (e.g., Latin script) from a source component. The source component can be, e.g., an input device such as a hardware or software keyboard, or a networking component for receiving the input token. The probabilistic model 120 converts the input token 115 written in the source script into an output token 195 written in a target script (e.g., Hindi or Japanese script). The output module 190 outputs the output token 195 to, e.g., an output device such as a display or a networking component for transmitting the output token.

The probabilistic model 120 includes a segmentation likelihood module 130, a decoding observation module 140, a prior distribution module 150, and a joint distribution module 160. The segmentation likelihood module 130 determines a probability of a possible segmentation of the input token into phonemes including a specific set of phonemes. The decoding observation module 140 determines a probability of decoding a particular set of segmented phonemes in the source script into a particular set of one or more characters in the target script. The prior distribution module 150 determines a prior probability distribution over an output token candidate. The joint distribution module 160 determines a probability of a particular possible transliteration conversion by multiplying together the probabilities generated from the segmentation likelihood module 130, the decoding observation module 140, and the prior distribution module 150. The joint distribution module 160 then generates the output token 195 by selecting a candidate of transliteration conversion, e.g., a candidate that has the highest probability.

The training pipeline 170 (also referred to herein as "training module" or "learning module") determines the parameters of the probabilistic model 120 based on a training set of known transliteration conversions. For example, the training set can include, e.g., a parallel corpus of words 175 in the source and target scripts.

Figure 2:
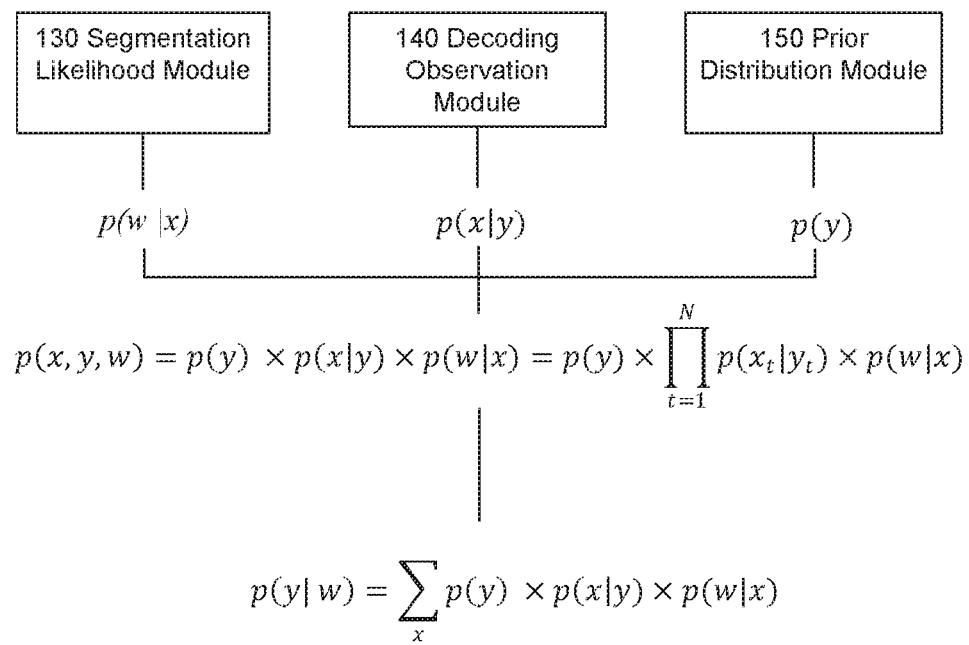
FIG. 2 is a block diagram illustrating operations of the segmentation likelihood module, decoding observation module, prior distribution module of a probabilistic model.

FIG. 2 is a block diagram illustrating operations of the segmentation likelihood module 130, the decoding observation module 140, and the prior distribution module 150, which are all part of the probabilistic model 120 illustrated in FIG. 1. Variable w represents the input token 115 in the source script. Variable y represents the output token 195 in the target script. The output token includes one or more output characters in the target script and the output characters are denoted as $y_t$, where t can be $\{1, \ldots, N\}$ and N is the number of the output characters in the output y.

Variable x denotes a possible segmentation of the input token 115 into phonemes or graphemes in various embodiments. Although phonemes are described herein, the disclosed operation can also apply to graphemes. The possible segmentation x includes phonemes that are denoted as $x_t$ and t can be $\{1, \ldots, N\}$. In some embodiments, the number of segmented phonemes M matches the number of output characters N (or the number of sets of output characters). In other words, M=N. In other embodiments, the number of segmented phonemes M can be larger or smaller than the number of output characters N, e.g., M≠N. Each phoneme $x_t$ comes from a vocabulary 135 of allowed phoneme candidates. In some embodiments, the vocabulary of phoneme candidates can be determined heuristically and can be over-inclusive. The probabilistic model 120 treats x, y, M and N as unknown variables. The variable w can be a known variable (also referred to herein as "observed variable").

The segmentation likelihood module 130 determines a probability p(w|x) that the input token w can be segmented based on a possible segmentation x. The decoding observation module 140 determines a probability $p(x_t|y_t)$ of decoding (e.g., transliterating) a particular segmented phoneme $x_t$ in the source script into a particular output character $y_t$ in the target script (also referred to herein as "emission probability"). Thus, a probability of decoding (transliterating) an input segmentation x in the source script into an output token y is $p(x|y) = \Pi_{t=1}^{N} p(x_t|y_t)$. The prior distribution module 150 determines a prior probability distribution over the output token p(y).

The joint probability distribution of an output token y based on a segmentation X of an input token w is determined by the following equation:

$$p(x,y,w) = p(y) \times p(x|y) \times p(w|x) = p(y) \times \Pi_{t=1}^{N} p(x_t|y_t) \times p(w|x) \quad \text{Eq. (1).}$$

The joint probability distribution of Eq. (1) can assume the following conditions: the output token y follows a probability distribution of words in the target script. The phonemes are mutually independent and generated by the emission probabilities $p(x_t|y_t)$. The probability p(w|x) can be set to equal to one whenever w is a concatenation of the segmented phonemes $x_1, \ldots, x_M$; and set to be zero otherwise. This ensures that only the valid segmentations x of w have non-zero probabilities in the probabilistic model 120.

Models for Prior Probability Distribution

The prior probability distribution p(y) can be characterized using different models. In some embodiments, for example, in a fully factored model, the characters $y_1, \ldots, y_N$ of the output script are independent of each other. The prior probability distribution is defined: $p(y) \triangleq \Pi_t p(y_t)$. This fully factored model is simple and can be applied in situations, e.g., where very little data is available for existing samples in the target script.

In some other embodiments, e.g. in a Markov chain model, the characters $y_1, \ldots, y_N$ form a first-order stochastic chain (e.g., Markov chain). In other words, the prior probability distribution is defined as: $p(y) \triangleq p(y_1) \Pi_t p(y_t|y_{t-1})$, where $p(y_1)$ is the initial probability distribution and $p(y_t|y_{t-1})$ is the transition model between two intermediate points in the stochastic chain. The Markov chain model provides a balance between model complexity and accuracy.

In some other embodiments, e.g. in a dictionary model, the probability for each word can be stored in a lookup table or incrementally in a tree data structure. The dictionary model can be applied in situations, e.g., where data is abundant in existing samples in the target script or where most words can be captured in existing samples in the target script.

In at least some embodiments, the probabilistic model 120 can prefer, e.g., longer segmentations of simpler phonemes over shorter segmentations of more complicated phonemes. For example, in order to give higher weight to the longer segmentations, the probabilistic model 120 can introduce additional multiplicative factor for the prior probability distributions.

Considering all Possible Segmentations

Given an observed input token w in the source script, a conditional probability distribution of an output token y converted from an input token w is a summation of probability distributions from Eq. (1):

$$p(y|w) = \Sigma_x p(y) \times p(x|y) \times p(w|x) \quad \text{Eq. (2).}$$

In other words, by considering all possible segmentations x, the probabilistic model 120 can provide an accurate prediction on the probability of an input token w being transliterated into output token y. Among the possible segmentations, many of them have a probability of zero, because those segmentations do not correspond to a valid segmentation. In order words, the concatenation of $x_1, \ldots, x_M$ is not the input token w.

Although there may be many candidates for possible decoded output token y, the probabilistic model 120 only concerns a few top candidates with large p(y|w). In other words, the goal of the probabilistic model is to maximize a posteriori estimation.

Representation of Segmentation

Figure 3:
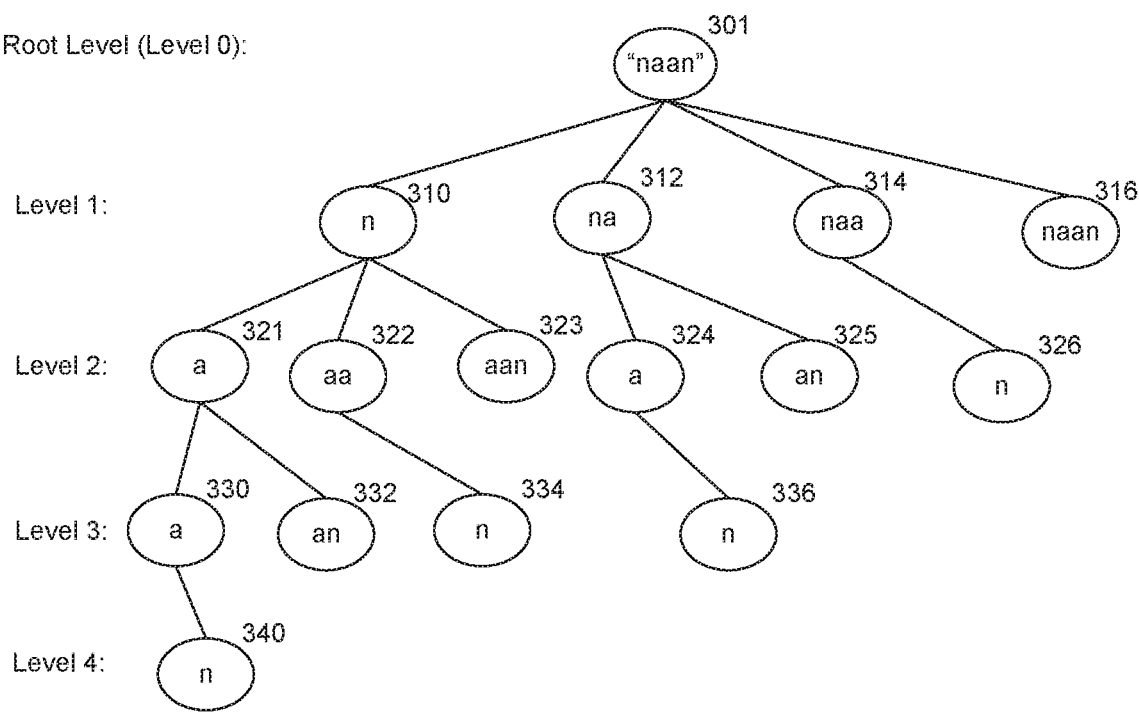
FIG. 3 is a block diagram illustrating an example of a prefix tree for representing valid segmentations.

There are different ways of identifying and representing valid segmentations x of input token w, other than enumerating all possible combinations of phonemes. One way is using a prefix tree model (also referred to herein as "tree structure"). FIG. 3 is a block diagram illustrating an example of a prefix tree for representing valid segmentations. Each node of the prefix tree 300 corresponds to a phoneme. Nodes of the first level (310, 312, 314, 316) of the prefix tree 300 below a root node 301 correspond to candidates of the first phoneme $x_1$; nodes of the second level (321-326) of the prefix tree 300 correspond to candidates of the second phoneme $x_2$, etc.

There are constraints on the prefix tree 300 associated with the input token w. A branch from the root node 301 to each node corresponds to a prefix of the input token w; the prefix includes one or more candidates of phonemes. A path from the root node 301 to a leaf node (also referred to herein as "end nodes," e.g., 340, 332, 334, 323, 336, 325, 326 or 316) that corresponds to a possible segmentation x of input token w.

In some embodiments, the probabilistic model 120 does not necessarily explore all branches of the prefix tree 300 and can abandon some branches for computational efficiency. For example, in some embodiments, a particular branch represents a prefix (including one or more phonemes) in the source script and the prefix can be transliterated into a specific prefix (including one or more characters) in the target script. However, there is no existing word in a vocabulary of the target script that starts with the specific transliterated prefix. In that case, that particular branch can be abandoned.

A node at level t stores a joint probability over the phonemes $x_{1:t}$ and possible prefixes $y_{1:t}$. Thus, the conditional probability distribution of Eq. (2) can be computed incrementally, by multiplying together the components of the prior module and the observation module. For example, with the fully factored model for the prior distribution p(y), the joint probability at level t can be:

$$p(x_{1:t}, y_{1:t}, w) = p(x_{1:t-1}, w) \times p(y_t) \times p(x_t | y_t) \qquad \text{Eq. (3).}$$

In some embodiments, to improve computational efficiency, the probabilistic model 120 can store only a number K of top candidates for prefixes $y_{1:t}$, ordered by $p(x_{1:t}, y_{1:t})$ at each node $x_{1:t}$. The top K candidates can be sufficient for an accurate prediction, because the top K candidates at level t are extensions of the top K candidates at level t−1.

In some scenarios, the prefix tree model may be complicated for some tokens. For example, the token "naaaaaaaaaan" has 10 Latin characters "a." Assuming that both phonemes "a" and "aa" exist, the prefix tree for the token "naaaaaaaaaan" would have a very large number of branches and leaves. A path with the least number of levels would include 5 levels of phonemes "aa." A path with the most number of levels would include 10 levels of phonemes "a." There are a very large number of branches between those two paths.

An alternative to the prefix tree model is a graph model (e.g., a directed acyclic graph ("DAG")). A DAG is a graph having vertices (also referred to herein as "nodes") and directional edges. Each directional edge starts from one vertex and ends at another vertex. The DAG has no directed cycles. In other words, there is no way in the DAG to start at a specific vertex and follow a consistently-directed sequence of directional edges that eventually loops back to the specific vertex again.

In the graph model, each individual vertex (node) represents a phoneme candidate at a specific location i in the string of the token. Paths from a root node to the individual nodes correspond to segmentations of the prefix of $w_{1:t}$ that end with this phoneme. The probabilities $p(x_{1:t}, y_{1:t}, w)$ are computed incrementally using Eq. (3). The total number of nodes of the DAG depends on the length of w and the maximum length of phonemes. The graph can be stored compactly in an array. The storage of the graph can grow incrementally as the probabilistic model extends w. Thus, the graph model reduces the number of allocations preformed during execution of the algorithm.

Parameter Learning for Probabilistic Model

The parameters of the probabilistic model 120 can be learned based on a training set of known transliteration conversions. In some embodiments, the training pipeline 170 can treat the transliteration as a special type of translation that operates on character level instead of a typical word level for translation.

In some embodiments, the probabilistic model 120 can assign each character within the output text in the target script an index $a_t$ that represents the position of this character in the source text (e.g., in a Latin script). Thus, the index $a_t$ is an alignment parameter identifying the transliteration relationship between the transliterated character in the output text and the corresponding character in the input text.

The probabilistic model can further leverage two assumptions of the character alignment of transliteration: monotonicity and completeness. The character alignment during a transliteration is always monotonic. In other words, the indices $a_t$ of the characters are strictly increasing with t. If a first character precedes a second character in the input token in the source script, a corresponding transliterated character of the first character precedes a corresponding transliterated character of the second character in the output token in the target script. The relative positions (alignment) of the characters do not change during the transliteration (also referred to herein as "monotonicity").

Moreover, there is one-to-one mapping between phoneme positions in the input token in the source script and target character positions in the output token in the target script (also referred to herein as "completeness"). The phonemes fully describe the target characters. In other words, no phonemes will be newly introduced or omitted during the transliteration.

The parameters are learned by observing known pairs of tokens in the source script and their corresponding well-aligned transliterated tokens in the target script. Such a data set including corresponding pairs of tokens in the source and target scripts is called a parallel corpus. An automatic character alignment of the transliteration is conducted by choosing the alignment that best fits the probabilistic model. In some embodiments, those two processes can be applied in a circular manner, which is also referred to herein as "expectation maximization algorithm."

Expectation Maximization Algorithm

The training pipeline 170 can use an expectation maximization algorithm to learn and optimize the parameters of the probabilistic model 120. The learning process can be based on, e.g., a training set of known transliteration conversions. For example, the training set can include, e.g., a parallel corpus of words 175 in the source and target scripts.

Given a parallel corpus of words in the source and target script $(w^{(i)}, y^{(i)})$, i=1, ..., L, the goal of training pipeline 170 is to generate model parameter sets θ, η that maximize a function associated with a likelihood that the model will transliterate the token in the source script $w^{(i)}$ into the token in the target script $y^{(i)}$. The parameter set η includes, e.g., parameters for prior probability distribution of output tokens in the target script. The parameter set θ includes, e.g., model parameters that relates to segmentation of phonemes.

The likelihood can be represented, e.g., by a log-likelihood function log $p(y^{(i)}, w^{(i)}|θ, η)$. Thus, the maximization process can be expressed as:

$$\max_{θ,η} \Sigma_i \log p(y^{(i)}, w^{(i)}|θ,η) = \max_{θ,η} \Sigma_i [\log p(y^{(i)}|η) + \log p(w^{(i)}|y^{(i)},θ)]. \quad \text{Eq. (4)}.$$

The Eq. (4) for maximization decomposes linearly over two parameter sets of θ and η. Since y is observed in the corpus for the target script, the training pipeline 170 can calculate the probability $p(y^{(i)}|η)$ by counting the instances of output tokens in the corpus for the target script. For example, the corpus in the target script can be an online resource such as Wikipedia in the target script. Thus, $p(y^{(i)}|η)$ can be learned from the corpus directly.

The parameter set for θ can be expressed as:

$$\Sigma_i \log p(w^{(i)}|y^{(i)},θ) = \Sigma_i \log \Sigma_x p(w^{(i)}|x) \times p(x|y^{(i)},θ). \quad \text{Eq (5)}.$$

Thus, the log-likelihood function part for the parameter set for θ depends on the parameters indirectly via a summation of observation model $p(x|y^{(i)})$. The training pipeline 170 can solve Eq. (5) by applying the expectation maximization algorithm, which alternative between two steps. In the first expectation step, the training pipeline 170 computes the posterior probability of each segmentation $α(x) \triangleq p(x|w^{(j)}, y)$. In the second maximization step, the training pipeline 170 computes the maximum likelihood estimation (MLE) of the likelihood function using the weighted samples $(y^{(i)}, x, α(x))$ for each valid segmentation x.

The expectation step can use a prefix tree model similar to the one described in the "Representation of Segmentation" section. Each node of the prefix tree represents a phoneme in a valid segmentation of a prefix of w. During the learning process, both input token w and output token y are observed from the parallel corpus and so the number of characters in the input and output tokens are fixed and known. Thus, each node stores a single probability $p(x_{1:t}, y_{1:t}, w)$ that is computed incrementally.

The training pipeline 170 then identifies all leaves that do not correspond to abandoned branches and computes the sum Z for those leaves. Then the training pipeline 170 computes the weighted counts $[y_t, x_t]$ by adding probabilities $α(x_{1:t})/Z$ for nodes $x_{1:t}$. The counts $[y_t, x_t]$ can be further normalized so that the counts sum to 1 for each $y_t$.

In some embodiments, instead of a prefix tree model, the training pipeline 170 can also use a graph model (e.g., DAG) similar to the one described in the "Representation of Segmentation" section. The graph model assumes that $α_i$ denotes the total probabilities of all segmentations that end at character i of w, grouped by segmentation length. Similarly, the graph model assumes that $β_i$ denotes the total probabilities of all segmentations that start at character i of w. When the training pipeline 170 identifies a phoneme $h=w_{i:j-1}$, the training pipeline 170 can calculate the total probability of all segmentation x that h participates in, by multiplying together the probabilities of $α_i$ and $β_j$ with h forming a segmentation of a length N. This probability then can be added to count $[y_t, x_t]$, similar to the prefix tree model.

Sample Transliteration Processes

Figure 4:
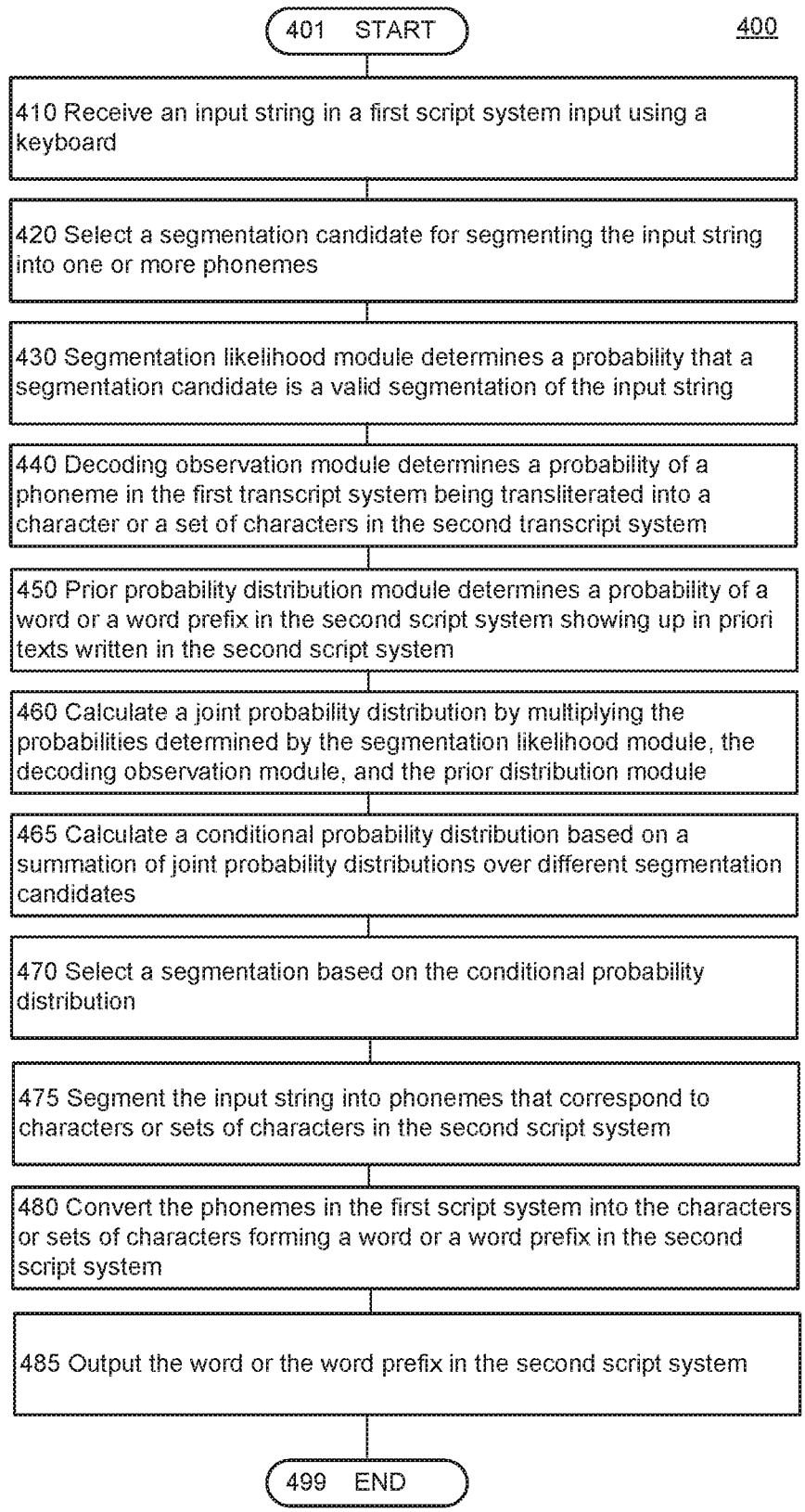
FIG. 4 is a block diagram illustrating a process for transliterating text entries from a first script system to a second script system.

FIG. 4 is a block diagram illustrating a process for transliterating text entries from a first script system (first script) to a second script system (second script). For example, the first script system can be a Latin script system and the second script system can be a non-Latin script system. At block 410, the transliteration system receives an input string in a first script system input using a keyboard. The keyboard can be, e.g., a hardware or software keyboard for inputting characters in the first script system. At block 420, a probabilistic model of the system selects a segmentation candidate for segmenting the input string into one or more phonemes. The probabilistic model includes, e.g., a segmentation likelihood module, a decoding observation module, and a prior distribution module.

At block 430, the segmentation likelihood module of the probabilistic model determines a probability that a segmentation candidate is a valid segmentation of the input string. The segmentation candidates can be modeled using a prefix tree model or a graph model as described in the "Representation of Segmentation" section.

At block 440, the decoding observation module of the probabilistic model determines a probability of a phoneme in the first transcript system being transliterated into a character or a set of characters in the second transcript system.

At block 450, the prior probability distribution module of the probabilistic model determines a probability of a word or a word prefix in the second script system showing up in priori texts written in the second script system. The prior probability distribution module can use a fully factored model, a Markov chain model, or a dictionary model as disclosed in the "Models for Prior Probability Distribution" section.

At block 460, the probabilistic model calculates a joint probability distribution by multiplying the probabilities determined by the segmentation likelihood module, the decoding observation module, and the prior distribution module. At block 465, the probabilistic model calculates a conditional probability distribution based on a summation of joint probability distributions over different segmentation candidates. At block 470, the probabilistic model selects a segmentation based on the conditional probability distribution.

At block 475, the system segments the input string into phonemes that correspond to characters or sets of characters in the second script system. At block 480, the system converts the phonemes in the first script system into the characters or sets of characters in the second script system, the characters or sets of characters forming a word or a word prefix in the second script system. At block 485, the system outputs the word or the word prefix in the second script system.

Figure 5:
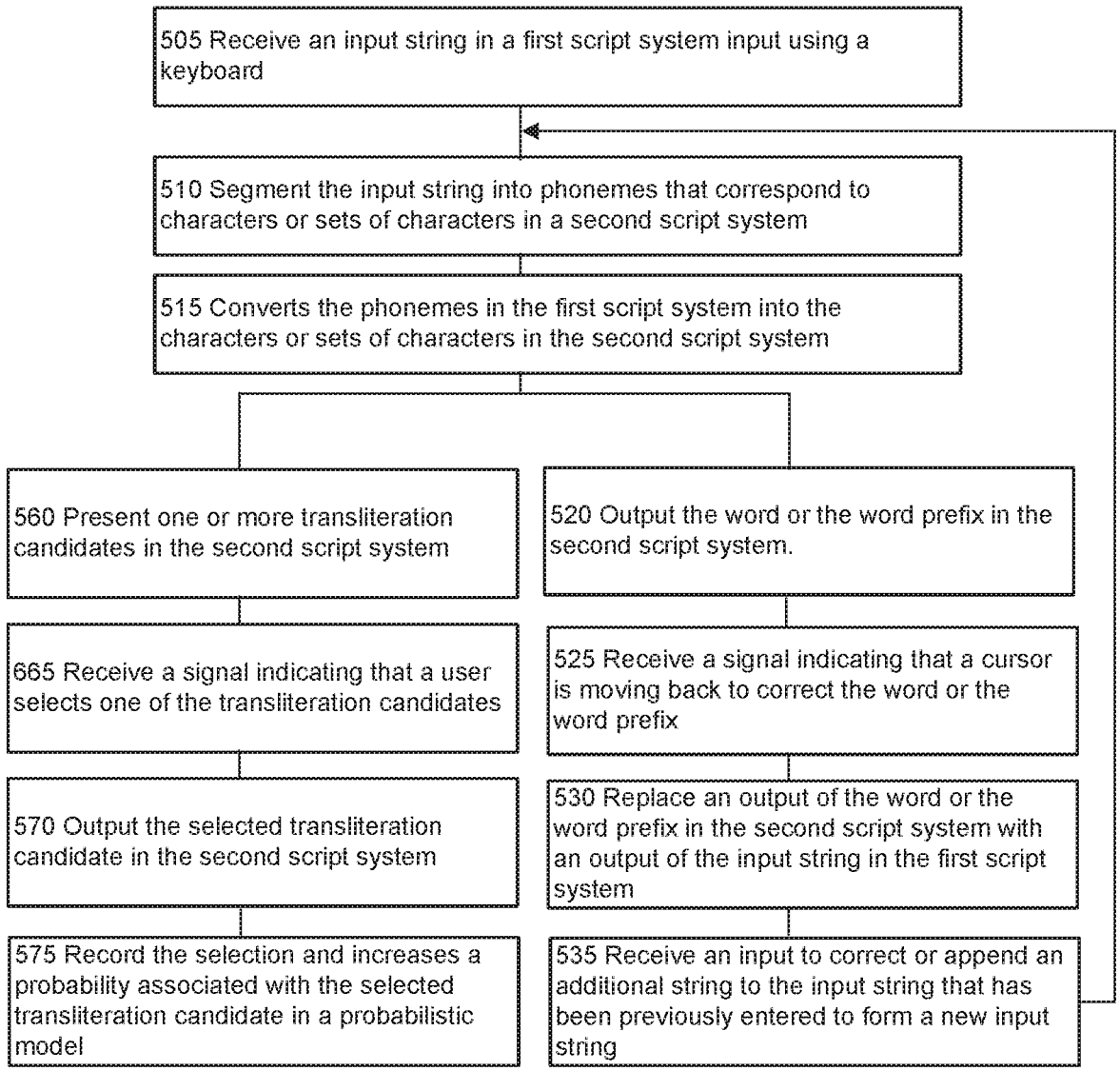
FIG. 5 is a block diagram illustrating a process for inputting a string in a second script system using an input mechanism for a first script system.

The transliteration technology can be applied, e.g., to a system for inputting a string in a script system using an input mechanism for another script system. FIG. 5 is a block diagram illustrating a process for inputting a string in a second script system using an input mechanism for a first script system. At block 505, the input system receives an input string in a first script system input using a keyboard. At block 510, the system segments the input string into phonemes that correspond to characters or sets of characters in a second script system. At block 515, the system converts the phonemes in the first script system into the characters or sets of characters in the second script system, the characters or sets of characters forming a word or a word prefix in the second script system. At block 520, the system outputs the word or the word prefix in the second script system.

The system can provide a mechanism for correcting the input. At block 525, the system receives a signal indicating that a cursor is moving back to correct the word or the word prefix. At block 530, in response to the signal, the system replaces an output of the word or the word prefix in the second script system with an output of the input string in the first script system (reverse transliteration). At block 535, the system receives an input to correct or append an additional string to the input string that has been previously entered to form a new input string. The process can proceed to blocks 510-520 to output another transliterated word or word prefix in the second script system.

In some embodiments, the system can present an associated word or an associated suffix following the word or the word prefix being outputted, wherein the associated word or the associated suffix is predicted based on the word or the word prefix.

In some embodiments, the system can provide multiple transliteration candidates. At block 560, the system presents one or more transliteration candidates in the second script system to a user. At block 565, the system receives a signal indicating that a user selects one of the transliteration candidates. At block 570, the system outputs the selected transliteration candidate in the second script system. At block 575, the system records the selection and increases a probability associated with the selected transliteration candidate in a probabilistic model.

Figure 6:
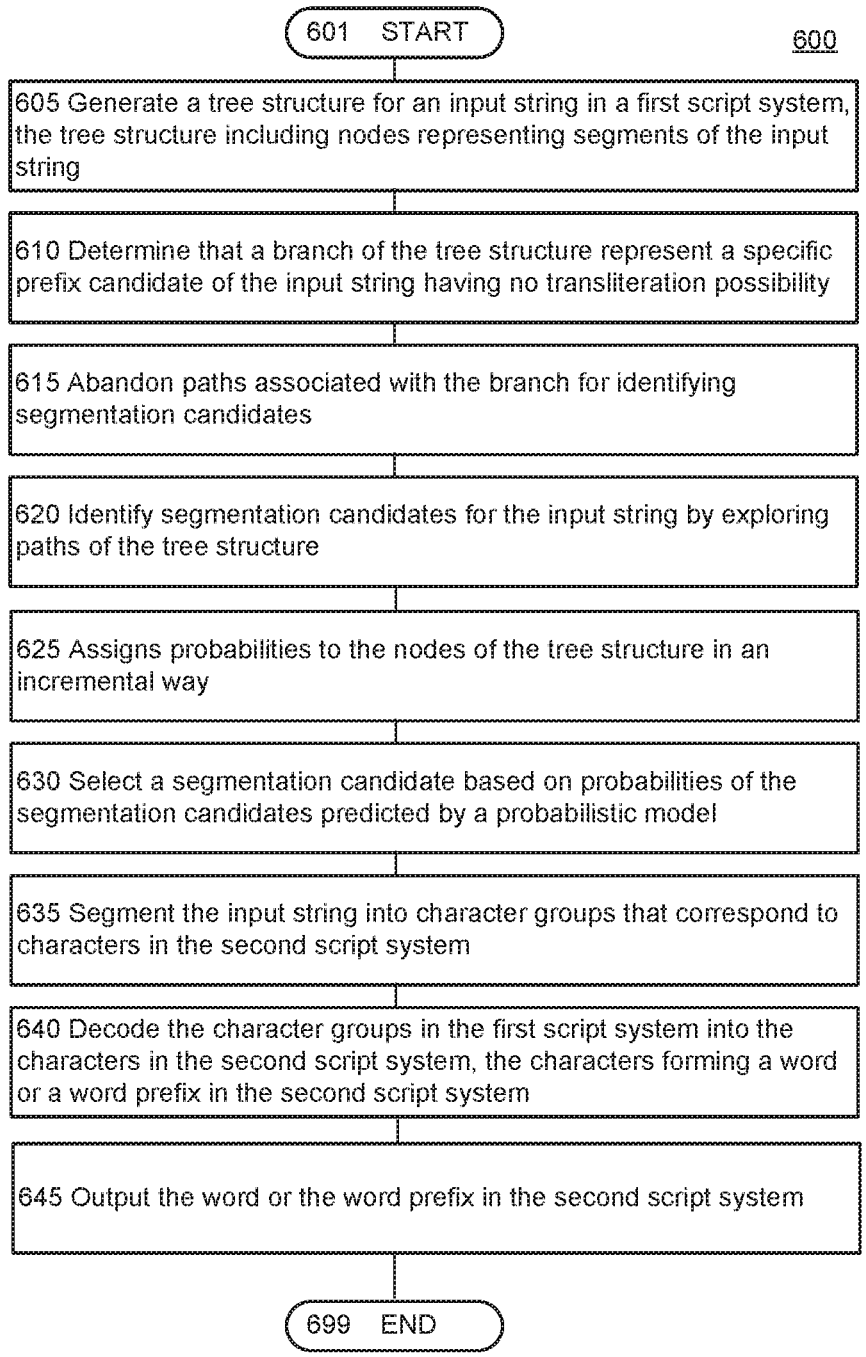
FIG. 6 is a block diagram illustrating a process for transliteration decoding using a tree structure.

FIG. 6 is a block diagram illustrating a process for transliteration decoding using a tree structure. At block 605, the transliteration system generates a tree structure for an input string in a first script system, the tree structure including nodes representing segments of the input string. The segments of the input string can be, e.g., phonemes of the input string. The tree structure can include multiple levels of nodes. For example, the first-level nodes of the tree structure represent candidates of a first character group of the input string. The second-level nodes of the tree structure represent candidates of a second character group that follows the first character group in the input string, and so on.

The tree structure includes paths that start at a root node of the tree structure and end at leaf nodes of the tree structure. The paths represent the segmentation candidates that segment the input string into character groups.

At block 610, the system determines that a branch of the tree structure represent a specific prefix candidate of the input string having no transliteration possibility. Branches of the tree structure start at a root node of the tree structure and end at nodes of the tree structure. The branches represent candidates of a prefix of the input string. For example, a specific prefix candidate has no transliteration possibility if no existing word in the second transcript system starts with a prefix that is a transliteration of the specific prefix candidate. At block 615, the system abandons paths associated with the branch for identifying segmentation candidates.

At block 620, the system identifies segmentation candidates for the input string by exploring paths of the tree structure. The paths represent the segmentation candidates segmenting the input string into character groups.

At block 625, the system assigning probabilities to the nodes of the tree structure in an incremental way. For a specific branch of the tree structure that starts at a root node of the tree structure and ends at a specific node, the specific branch representing a specific prefix of the input string. A probability assigned to the specific node is a probability that the specific prefix is segmented into character groups represented by nodes of the specific branch and the character groups are transliterated into another prefix in the second script system.

The probabilities can be determined in an incremental way. For example, for a second specific node that follows the specific node and locates at one level below the specific node, a probability assigned to the second specific node can be determined incrementally based on the probability assigned to the specific node.

At block 630, the system selects a segmentation candidate based on probabilities of the segmentation candidates predicted by a probabilistic model. At block 635, the system segments the input string into character groups that correspond to characters in the second script system.

At block 640, the system decodes the character groups in the first script system into the characters in the second script system, the characters forming a word or a word prefix in the second script system. At block 645, the system outputs the word or the word prefix in the second script system.

Figure 7:
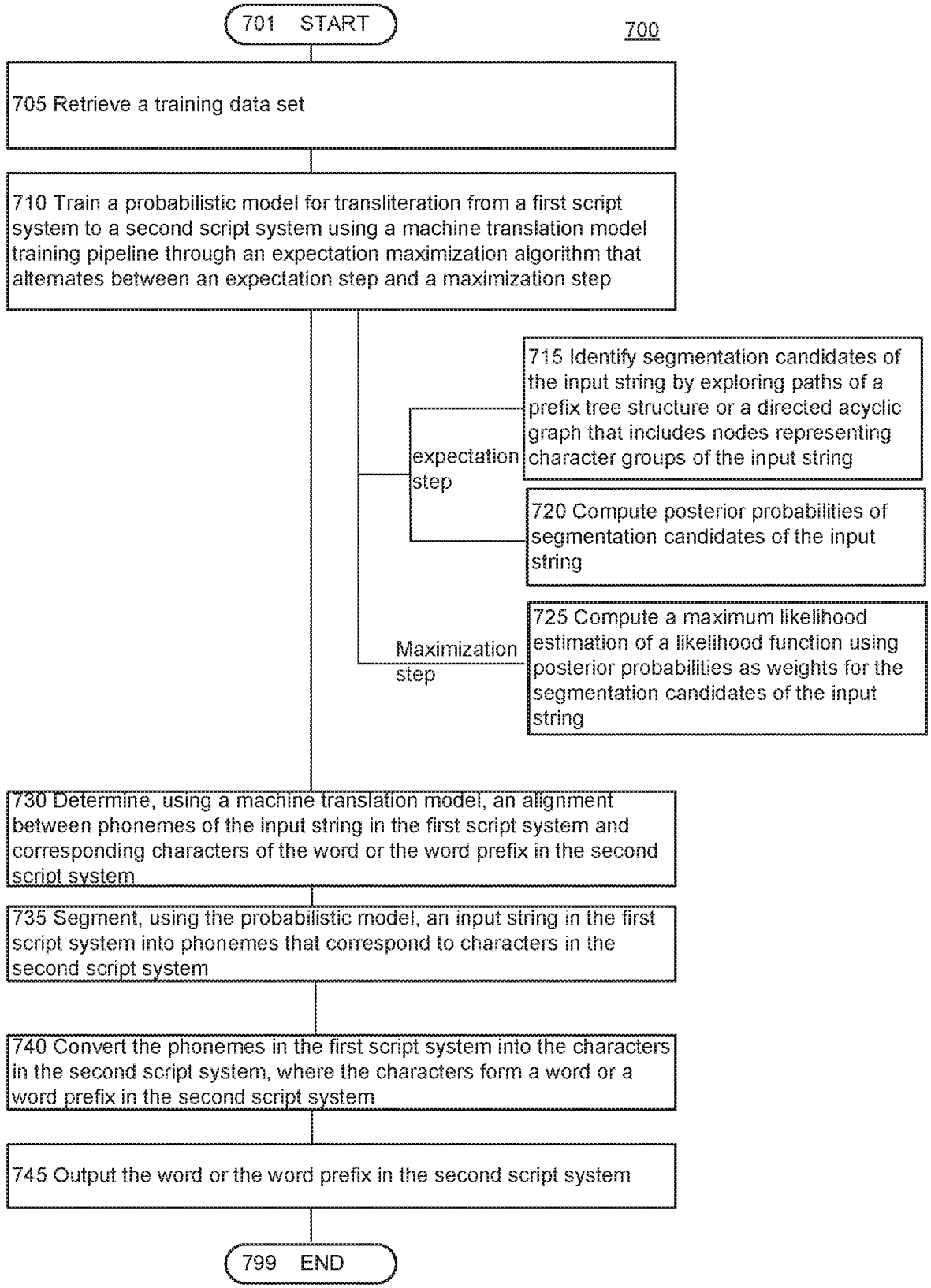
FIG. 7 is a block diagram illustrating transliteration based on a machine translation model training pipeline.

In some embodiments, the transliteration can be treated as a special type of machine translation that operates on a character level instead of a word level. FIG. 7 is a block diagram illustrating transliteration based on a machine translation model training pipeline. At block 705, the transliteration system retrieves a training data set. The training data set can include, e.g., profile names provided users in the first script system and the second script system. Alternatively, the data set can include, e.g., a user-input word in the first script system and a user-selected alternate word in the second script system. A user inputs the user-input word in the first script system and selects the user-selected alternate word in the second script system by using a cross-script software or hardware keyboard.

At block 710, the system trains a probabilistic model for transliteration from a first script system to a second script system using a machine translation model training pipeline through an expectation maximization algorithm that alternates between an expectation step and a maximization step.

During the expectation step, the system identifies segmentation candidates of the input string by exploring paths of a prefix tree structure or a directed acyclic graph that includes nodes representing character groups of the input string (block 715). Then the system computes posterior probabilities of segmentation candidates of the input string (block 720).

During the maximization step, the system computes a maximum likelihood estimation of a likelihood function using posterior probabilities as weights for the segmentation candidates of the input string (block 725).

At block 730, the system determines, using a machine translation model, an alignment between phonemes of the input string in the first script system and corresponding characters of the word or the word prefix in the second script system. In some embodiments, the alignment follows two assumptions: monotonicity and completeness. The alignment is monotonic if relative positions of the characters within the word or the word prefix in the second script system follow relative positions of the phonemes within the input string in the first script system. The alignment is complete if there is a one-to-one mapping between positions of the phonemes within the input string in the first script system and positions of the characters within the word or the word prefix in the second script system At block 735, the system segments, using the probabilistic model, an input string in the first script system into phonemes that correspond to characters in the second script system. At block 740, the system converts the phonemes in the first script system into the characters in the second script system, where the characters form a word or a word prefix in the second script system. At block 745, the system outputs the word or the word prefix in the second script system.

Sample Hardware Architecture

Figure 8:
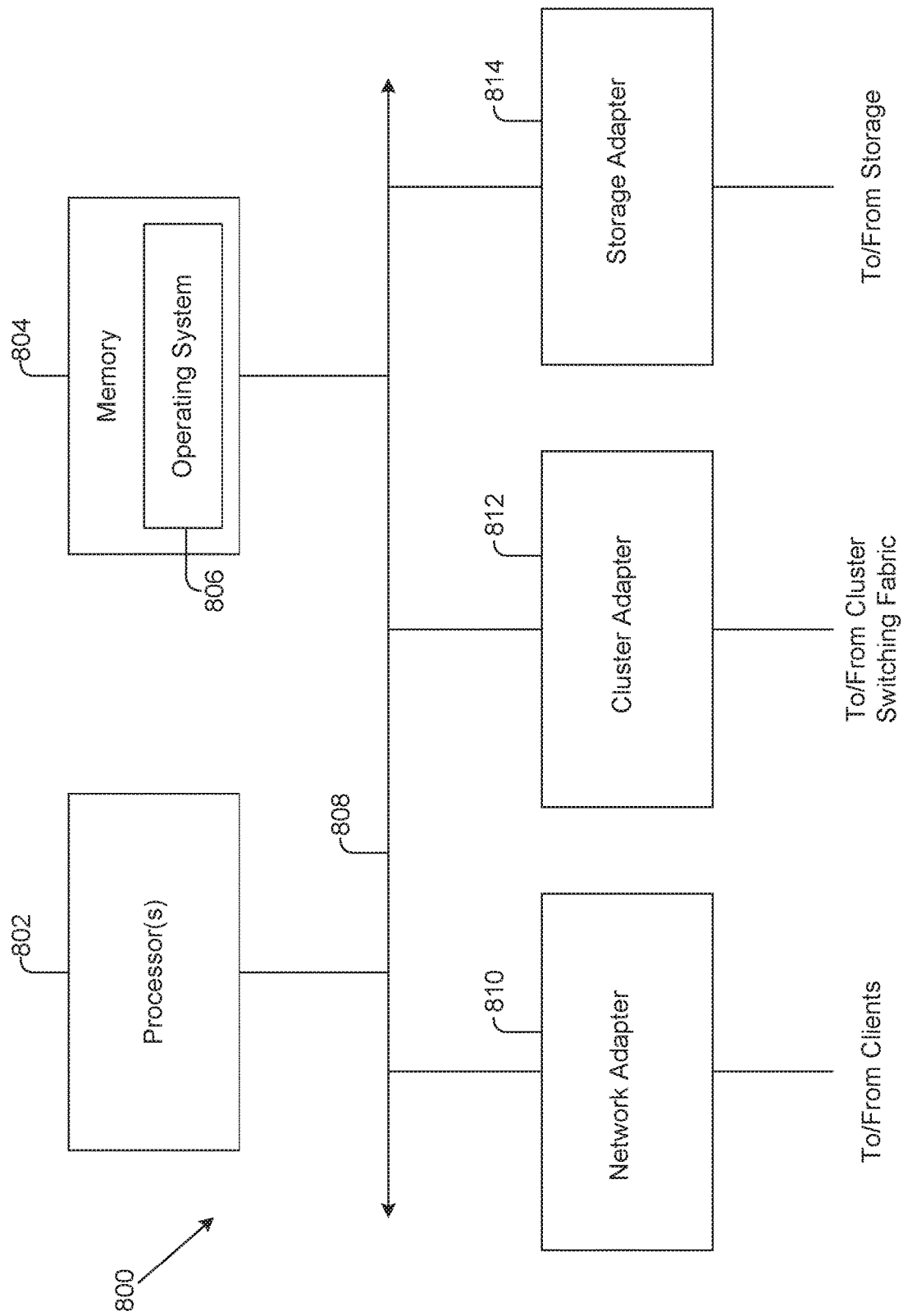
FIG. 8 is a high-level block diagram illustrating an example of a hardware architecture of a computing device that performs disclosed processes, in various embodiments.

FIG. 8 is a high-level block diagram illustrating an example of a hardware architecture of a computing device 800 that performs the above process, in various embodiments. The computing device 800 executes some or all of the processor executable process steps that are described below in detail. In various embodiments, the computing device 800 includes a processor subsystem that includes one or more processors 802. Processor 802 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 800 can further include a memory 804, a network adapter 810, a cluster access adapter 812 and a storage adapter 814, all interconnected by an interconnect 808. Interconnect 808 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (also referred to herein as "Firewire") or any other data communication system.

The cluster access adapter 812 includes one or more ports adapted to couple the computing device 800 to other devices. In the illustrated embodiment, Ethernet can be used as the clustering protocol and interconnect media, although other types of protocols and interconnects may be utilized within the cluster architecture described herein.

The computing device 800 can be embodied as a single- or multi-processor storage system executing a storage operating system 806 that can implement a high-level module, e.g., a storage manager, to logically organize the information as a hierarchical structure of named directories, files and special types of files called virtual disks at the storage devices. The computing device 800 can further include graphical processing unit(s) for graphical processing tasks or processing non-graphical tasks in parallel.

The memory 804 can comprise storage locations that are addressable by the processor(s) 802 and adapters 810, 812, and 814 for storing processor executable code and data structures. The processor 802 and adapters 810, 812, and 814 may, in turn, comprise processing elements and/or logic circuitry configured to execute the software code and manipulate the data structures. The operating system 806, portions of which is typically resident in memory and executed by the processors(s) 802, functionally organizes the computing device 800 by (among other things) configuring the processor(s) 802 to invoke. It will be apparent to those skilled in the art that other processing and memory implementations, including various computer readable storage media, may be used for storing and executing program instructions pertaining to the technology.

The network adapter 810 can include multiple ports to couple the computing device 800 to one or more clients over point-to-point links, wide area networks, virtual private networks implemented over a public network (e.g., the Internet) or a shared local area network. The network adapter 810 thus can include the mechanical, electrical and signaling circuitry needed to connect the computing device 800 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 814 can cooperate with the storage operating system 806 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 814 can include multiple ports having input/output (I/O) interface circuitry that couples to the disks over an I/O interconnect arrangement, e.g., a conventional high-performance, Fibre Channel (FC) link topology. In various embodiments, the cluster adapter 812 and the storage adapter 814 can be implemented as one adaptor configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for transliteration comprising:
    accessing a training data set for a machine translation model, the training data set including names of users in a first text script system and a second text script system;
    training a probabilistic model for transliteration from the first text script system to the second text script system using the training data set, the probabilistic model comprising a probability of a possible segmentation of an input in the first text script system into one or more phonemes in the first text script system, a probability of decoding the one or more phonemes in the first text script system to a particular set of one or more characters in the second text script system, or a prior probability distribution over an output in the second text script system, wherein the prior probability distribution is based on a dictionary model;
    segmenting, using the probabilistic model, an input text string in the first text script system into phonemes corresponding to characters in the second text script system;
    converting the phonemes in the first text script system into the characters in the second text script system based on the probabilistic model, the characters forming a word or a word prefix in the second text script system; and
    outputting the word or the word prefix in the second text script system.

2. The method of claim 1, wherein the training comprises:
training a probabilistic model for transliteration from a first script system to a second script system using a machine translation model training pipeline based on a training data set for a machine translation model.

3. The method of claim 1, wherein the training comprises:
training a probabilistic model for transliteration from a first script system to a second script system using a machine translation model training pipeline based on a training data set for a machine translation model;
wherein the training data set includes a user-input word in the first script system and a user-selected alternate word in the second script system.

4. The method of claim 3, wherein a user inputs the user-input word in the first script system and selects the user-selected alternate word in the second script system by using a cross-script software or hardware keyboard.

5. The method of claim 1, wherein the segmenting comprises:
determining, using a machine translation model, an alignment between phonemes of the input string in the first script system and corresponding characters of the word or the word prefix in the second script system.

6. The method of claim 1, wherein the segmenting comprises:
determining, using a machine translation model, an alignment between phonemes of the input string in the first script system and corresponding characters of the word or the word prefix in the second script system;
wherein the alignment is monotonic such that relative positions of the characters within the word or the word prefix in the second script system follow relative positions of the phonemes within the input string in the first script system.

7. The method of claim 1, wherein the segmenting comprises:
determining, using a machine translation model, an alignment between phonemes of the input string in the first script system and corresponding characters of the word or the word prefix in the second script system;
wherein the alignment is complete such that there is a one-to-one mapping between positions of the phonemes within the input string in the first script system and positions of the characters within the word or the word prefix in the second script system.

8. The method of claim 5, wherein the determining an alignment comprises:
assigning indexes to characters of the word or the word prefix in the second script system, the indexes representing positions of corresponding phonemes within input string in the first script system; and
determining, by the machine translation model, values of the indexes assigned to the characters of the word or the word prefix in the second script system.

9. The method of claim 1, wherein the training comprises:
training a probabilistic model for transliteration from a first script system to a second script system using an expectation maximization algorithm.

10. The method of claim 9, wherein the training comprises:
training a probabilistic model for transliteration by alternating between an expectation step and a maximization step.

11. The method of claim 10, wherein the training comprises:
conducting the expectation step for training the probabilistic model by computing posterior probabilities of segmentation candidates of the input string.

12. The method of claim 11, wherein the training comprises:
conducting the maximization step for training the probabilistic model by computing a maximum likelihood estimation of a likelihood function using posterior probabilities as weights for the segmentation candidates of the input string.

13. The method of claim 10, wherein the expectation step comprises:
identifying segmentation candidates of the input string by exploring paths of a prefix tree structure, the prefix tree structure including nodes representing character groups of the input string.

14. The method of claim 10, wherein the expectation step comprises:
identifying segmentation candidates of the input string by exploring paths of a directed acyclic graph, the directed acyclic graph including nodes representing character groups of the input string and directional edges between nodes.

15. The method of claim 1, wherein the training comprises:
training a probabilistic model for transliteration from a first script system to a second script system using a machine translation model training pipeline based on a training data set;
wherein the training data set includes a parallel corpus, the parallel corpus including words in the first script system and corresponding words in the second script system.

16. A non-transitory machine-readable storage medium comprising a program containing a set of instructions for causing a machine to execute procedures for transliteration based on a machine translation model training pipeline, the procedures comprising:
accessing a training data set for a machine translation model, the training data set including names of users in a first text script system and a second text script system;
training a probabilistic model for transliteration from the first text script system to the second text script system using the training data set, the probabilistic model comprising a probability of a possible segmentation of an input in the first text script system into one or more phonemes in the first text script system, a probability of decoding the one or more phonemes in the first text script system to a particular set of one or more characters in the second text script system, or a prior probability distribution over an output in the second text script system, wherein the prior probability distribution is based on a dictionary model;
segmenting, using the probabilistic model, an input text string in the first text script system into phonemes corresponding to characters in the second text script system;
converting the phonemes in the first text script system into the characters in the second text script system based on the probabilistic model, the characters forming a word or a word prefix in the second text script system; and
outputting the word or the word prefix in the second text script system.

17. The non-transitory machine-readable storage medium of claim 16, wherein the training comprises:
training a probabilistic model for transliteration using a training data set that includes a user-input word in the first script system and a user-selected alternate word in the second script system, wherein a user inputs the user-input word in the first script system and selects the user-selected alternate word in the second script system by using a cross-script software or hardware keyboard.

18. A computing device, comprising:

a processor; and a memory storing instructions which, when executed by the processor, cause the computing device to perform a process including:

accessing a training data set for a machine translation model, the training data set including names of users in a first text script system and a second text script system;

training a probabilistic model for transliteration from the first text script system to the second text script system using the training data set, the probabilistic model comprising a probability that a first text can be segmented based on a probability of a possible segmentation of an input in the first text script system into one or more phonemes in the first text script system, a probability of decoding the one or more phonemes in the first text script system to a particular set of one or more characters in the second text script system, or a prior probability distribution over an output in the second text script system, wherein the prior probability distribution is based on a dictionary model;

segmenting, using the probabilistic model, an input text string in the first text script system into phonemes corresponding to characters in the second text script system;

converting the phonemes in the first text script system into the characters in the second text script system based on the probabilistic model, the characters forming a word or a word prefix in the second text script system; and outputting the word or the word prefix in the second text script system.

* * * * *